US005249036A

United States Patent [19]

Balducci

[11] Patent Number: 5,249,036

[45] Date of Patent: Sep. 28, 1993

[54] METHOD AND DEVICE FOR REGULATING THE WATER-INK EQUILIBRIUM ON AN OFFSET PLATE OF AN OFFSET MACHINE

[75] Inventor: Laurent Balducci, Trappes, France

[73] Assignee: Association de Gestion de l'Ecole Francaise de Papeterie et de l'Imprimerie, Paris, France

[21] Appl. No.: 799,484

[22] Filed: Nov. 27, 1991

[30] Foreign Application Priority Data

Nov. 30, 1990 [FR] France ............ 90 15385

[51] Int. Cl.$^5$ ............ G01N 21/55; G01N 21/47

[52] U.S. Cl. ............ 356/445; 101/DIG. 45; 356/446

[58] Field of Search ............ 356/445, 446, 447, 448; 101/DIG. 45, DIG. 47

[56] References Cited

U.S. PATENT DOCUMENTS

| | | | |
|---|---|---|---|
| 3,960,451 | 6/1976 | Wirz et al. | 356/382 |
| 3,981,238 | 9/1976 | Dini | 101/154 |
| 4,677,298 | 6/1987 | Zelmanovic et al. | 356/446 |
| 4,737,035 | 4/1988 | Aoki et al. | 356/446 |
| 4,976,545 | 12/1990 | Kipphan et al. | 356/446 |

FOREIGN PATENT DOCUMENTS

| | | |
|---|---|---|
| 2214721 | 6/1973 | Fed. Rep. of Germany . |
| 3611645 | 10/1987 | Fed. Rep. of Germany . |

*Primary Examiner*—Richard A. Rosenberger

*Attorney, Agent, or Firm*—Lowe, Price, LeBlanc & Becker

[57] ABSTRACT

A method is provided for controlling a water-ink equilibrium on a moving offset plate 2 in an offset copying machine wherein the offset plate is fixed to a rotating cylinder 1. The method includes the step of illuminating a predetermined area 35 of the moving offset plate 2, the density of which is known, with a coherent light source 30 under normal incidence. A portion of the light reflected around an axis perpendicular to the plane of the illuminated area 35 is collected in the focal plane of a convergent optical system 32. The intensity of the collected light is measured at at least one location in the focal plane of the convergent optical system. In another aspect of the invention there is provided a device for regulating a water-ink equilibrium on a movable offset plate fixed to a rotatable cylinder in an offset copying machine, the device including a coherent light source illuminating under a normal incidence a predetermined area of the offset plate, light-intensity measuring means including a sensor placed at an axis of and in a focal plane of a convergent optical system for collecting and measuring the intensity of a fraction of the light reflected from the predetermined area and for generating a corresponding signal, and a servo-control system disposed to receive and respond to the signal provided by the sensor to adjust wetting and/or inking of the moving offset plate.

7 Claims, 2 Drawing Sheets

METHOD AND DEVICE FOR REGULATING THE WATER-INK EQUILIBRIUM ON AN OFFSET PLATE OF AN OFFSET MACHINE

BACKGROUND OF THE INVENTION

The present invention relates to offset machines and more particularly to inking and wetting methods of the offset plate.

Before referring to the problems which the invention intends to solve, the operation of an offset machine will be briefly described.

FIG. 1 shows a simplified exemplary mechanism of an offset machine. A printing cylinder 1, on which an offset plate 2 is mounted, first contacts wetting rollers 3*a* and 3*b* then inking rollers 4*a* and 4*b*. The ink on plate 2 is then transferred onto a so called blanket or cylinder 5. Blanket 5 contacts a pressing cylinder 6. A sheet of paper 7 passing between cylinders 5 and 6 is printed by the ink present on blanket 5.

The surface of the offset plate 2 is so constituted that, during the inking phase, the ink deposits only on the desired areas of the plate for constituting an image.

FIG. 2 is an enlargement of a cross section of the offset plate 2. A resin film has been deposited on the rough surface 20 of plate 2 then etched as a function of the image to be reproduced while leaving resin dots 21 having variable dimensions and resin free regions 22. The term "density" will be referred to hereafter as the ratio between the surface area of the dots 21 and the surface area of the regions 22. During wetting by rollers 3, the jaggedness of surface 20 collects the water which is moreover repelled by the dots 21 which are hydrophobic. Then, during inking by rollers 4, the ink which is greasy and therefore hydrophobic deposits essentially on dots 21 which are moreover oil attracting.

According to the respective amounts of water and ink deposited on plate 2, the ink coverage ratio changes, that is, the ink more or less covers the dots 21, while the water occupies the remaining surface. Thus, the problem encountered is to depart as little as possible from the water-ink equilibrium which corresponds to the ideal state where the ink would exactly cover the dots 21, in other words, where the coverage ratio would be equal to the density.

For a proper operation, the respective amounts of water and ink have to range within determined limits, namely an upper limit where the ink would smudge when transferred onto blanket 5 and a lower limit where the water in regions 22 would not entirely cover the peaks of the jagged surface 20. If the lower limit is not observed, ink also sticks on regions 22 and it is necessary to clean the offset plate.

In conventional offset machines, the water ink equilibrium is obtained by separate manual adjusting of the wetting and inking. The effect of these adjustments is liable to be controlled by a control bar which is printed simultaneously with each image. The control bars comprise several screened areas having different dot sizes and different ideal coverage ratios. These control bars are viewed or examined with optical densitometers on the printed sheet to determine whether wetting and inking adjustments are to be readjusted.

French patent application FR A-2,556,283 (under priority of U.S. patent applications Ser. No. 560,837 of Dec. 13, 1983 and No. 618,252 of Jun. 7, 1984) describes a system for measuring the average amount of water present on the inking roller in motion. The roller is illuminated under a non-normal incidence and the reflected light is collected by several optical sensors. The signals provided by these sensors are then processed for obtaining an indication of the average amount of water on the roller. A drawback of this system is that no indication on the coverage ratio of the offset plate is obtained, which, as seen above, is essential for detecting the water-ink equilibrium. A further drawback is related to the illumination of the roller under an incidence different from the normal, which causes intensity variations at the sensors depending on the surface defects and roller misalignment.

SUMMARY OF THE INVENTION

An object of the invention is to continuously provide an indication of the water-ink equilibrium on an offset plate. A further object of the invention is to overcome known problems related to the surface defects and misalignment.

These objects and others of the invention are achieved by a method for controlling the water-ink equilibrium in an offset machine including an offset plate fixed on a cylinder. The method comprises the following steps: illuminating under a normal incidence, with a coherent light source, a predetermined area of the offset plate in motion, the density of which is known; collecting in the focal plane of a convergent optical system a portion of the light reemitted around an axis perpendicular to the plane of the illuminated area; and measuring the light intensity in at least one area of the focal plane.

According to an embodiment of the invention, the light intensity is measured around the axis.

According to an embodiment of the invention, the light intensity is, in addition, also measured in at least one area distant from the lens axis.

According to an embodiment of the invention, the predetermined area is a regularly screened area.

According to an embodiment of the invention, the predetermined area is illuminated in synchronism with the motion of the offset plate.

To carry out this method, in another aspect of the invention there is further provided a device for regulating the water-ink equilibrium in an offset machine comprising an offset plate fixed on a cylinder and a system for wetting and inking this plate. The device comprises: a coherent light source illuminating under a normal incidence a predetermined area of the offset plate in motion; a measuring cell comprising a sensor placed on the axis and in the focal plane of a convergent optical system, which collects a fraction of the light reemitted by this area; a servo-control system sensitive to the signal provided by the sensor for adjusting the wetting and/or inking of the offset plate.

According to an embodiment of the invention, at least a second sensor is placed distant from the axis in the focal plane of the convergent optical system, and means are provided for acting on the servo control system for determining a minimal wetting from the signal of this second sensor.

BRIEF DESCRIPTION OF THE DRAWINGS

The foregoing and other objects, features and advantages of the invention will be apparent from the following detailed description of the preferred embodiments as illustrated in the accompanying figures wherein.

In the drawings, the same reference numerals are used to designate the same elements.

DETAILED DESCRIPTION OF THE INVENTION

Figure 1:
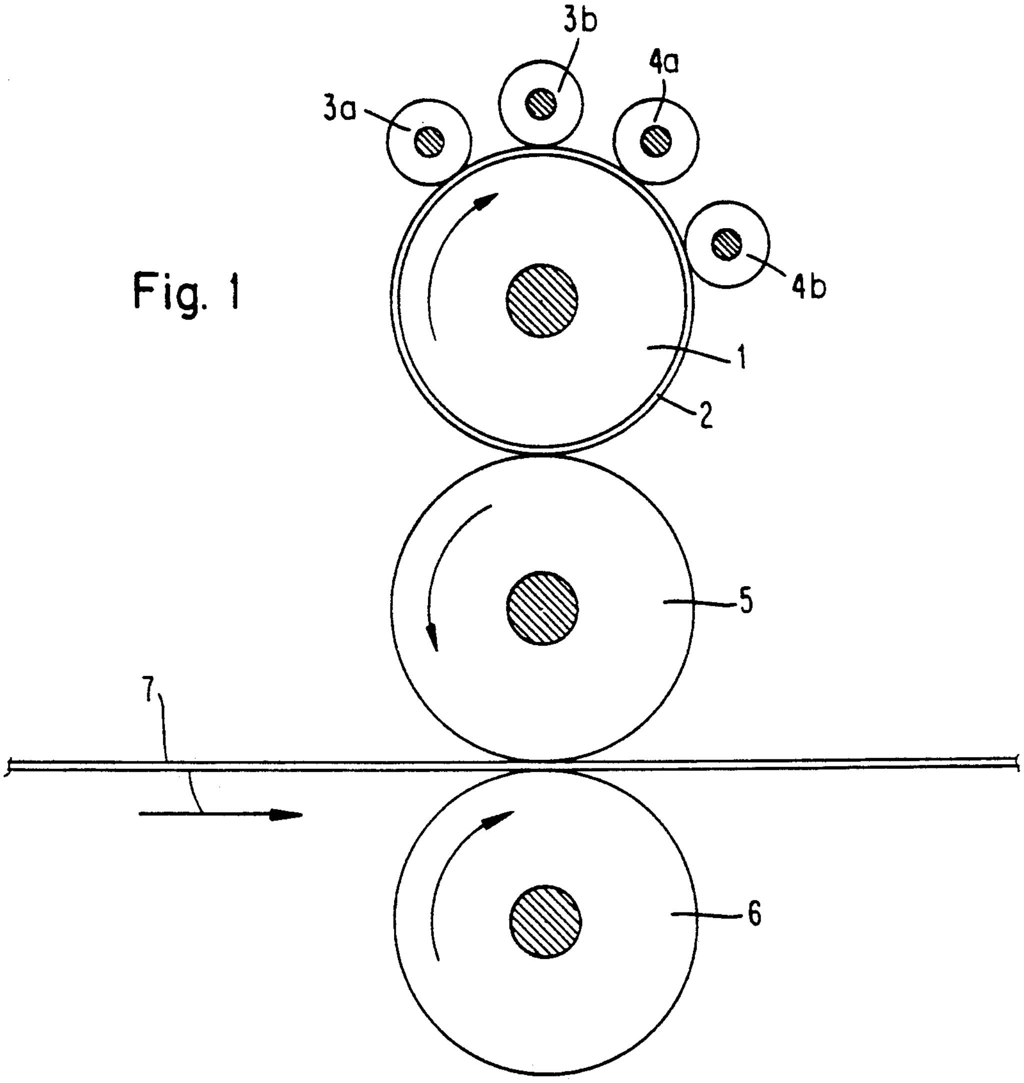
FIGS. 1 and 2, above described, illustrate the state of the art.
Figure 3:
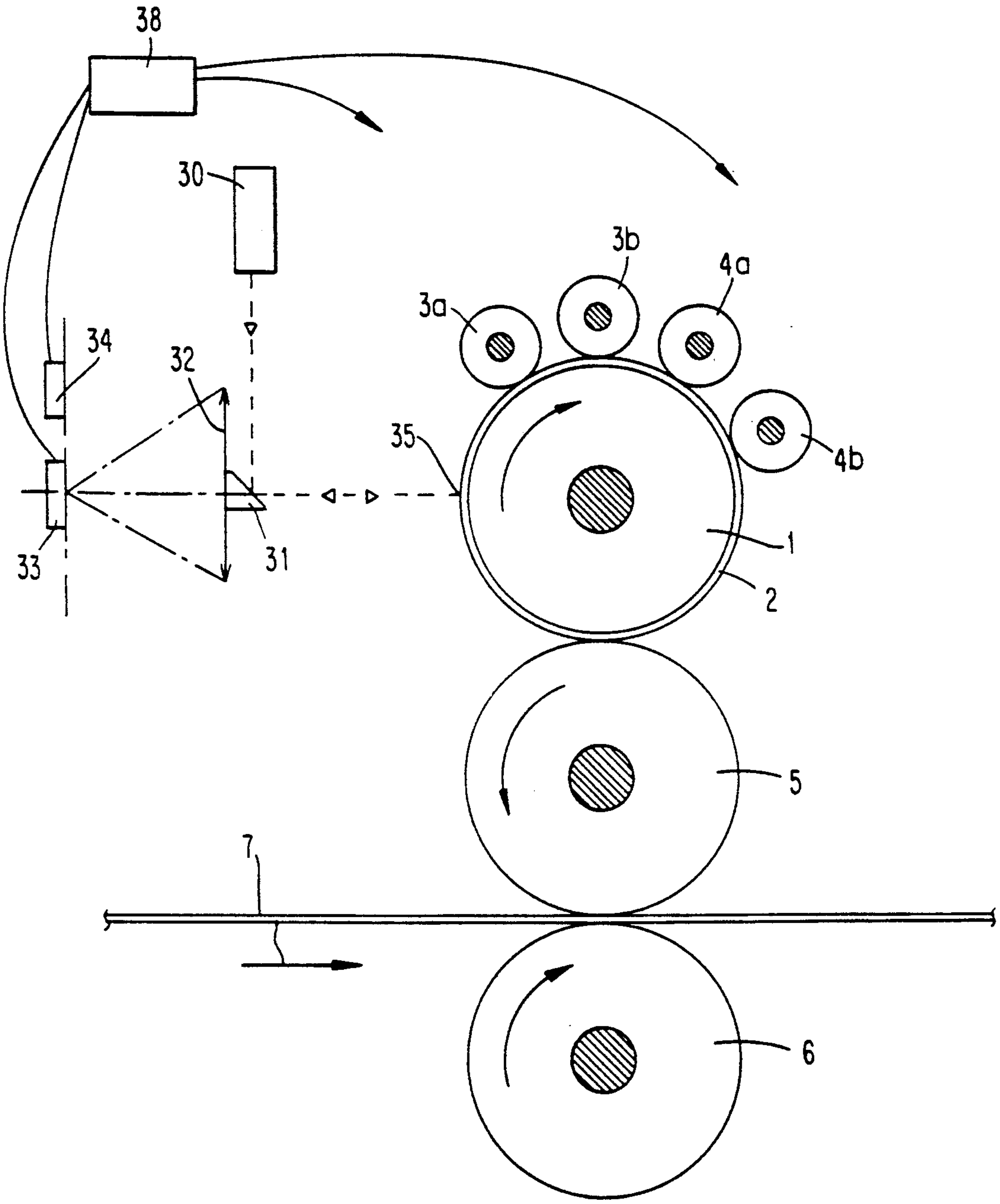
FIG. 3 shows a preferred embodiment according to the invention.

FIG. 3 shows a device according to the invention for providing an indication on the water-ink equilibrium. The device is adapted for use with a conventional offset machine, for example that of FIG. 1. A coherent light source 30, such as a laser, provides a beam which is reflected on a mirror 31 for projecting, normally to its surface, a light spot on the offset plate 2 in motion. A convergent lens 32, the axis of which is perpendicular to plate 2, bears the mirror 31 and collects the light reemitted by the illuminated area of the plate. Two sensors 33 and 34 are placed in the focal plane 40 of lens 32, sensor 33 also being located at the lens axis 50.

Illuminating plate 2 normally and collecting the light reemitted in the normal direction renders the device practically insensitive to the surface defects and misalignment of cylinder 1.

The above system is activated at precise moments when the light source 30 illuminates a predetermined area 35 of plate 2, the characteristics of which are known, especially the density. This predetermined area is, for example, one of the screened areas of a control bar printed simultaneously with each image.

This specific arrangement and the use of coherent light source enable the device to obtain in the focal plane 40 of lens 32 the Fourier transform of the wave reemitted from area 35. It has been proved that the average value of this Fourier transform, which is a light intensity measured by sensor 33, varies inversely with respect to the variation of the coverage ratio of area 35. As the density of this area is known, the water-ink equilibrium the area should have is also known.

Thus, by considering a predetermined area 35 which reflects the overall conditions, it is possible to correct the adjustments of wetting and/or inking in a servo-control system 38 for maintaining the overall water-ink equilibrium as follows. One thus establishes the difference $I-I_0$ between a signal I provided by sensor 33 and a reference signal $I_0$ which corresponds to the signal provided by the sensor when the water-ink equilibrium is achieved in area 35. Then, the wetting and/or inking is adjusted, for example, proportionally to $I_0-I$ and to $I-I_0$, respectively, for reducing, and ideally cancelling, the difference $I-I_0$.

Figure 2:
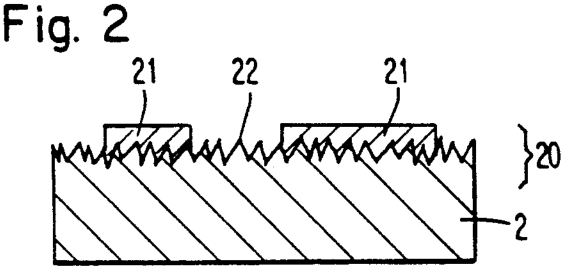

Within a ring of the focal plane 40 of lens 32 distant from the lens axis, there happen to be secondary light spots, the particularity of which is that they have an intensity which abruptly drops when the amount of water deposited on the offset plate 2 in the predetermined area 35 reaches a lower limit that is, referring again to FIG. 2, during wetting, when the water deposited on the offset plate does not entirely cover the peaks of the ragged surface 20. Thus, with a sensor 34 measuring this secondary intensity, it is also possible to control whether the lower limit is taken into account. This information can also be advantageously used by the servo-control system 38 for correcting the wetting adjustments.

The device according to the invention can be adapted to any offset machine and may be associated with a known servo-control system, easy to achieve by those skilled in the art, which allows to act on the wetting and/or inking adjustments.

Various alternatives and modifications of the invention will appear to those skilled in the art. For example, for collecting the light reemitted about an axis perpendicular to the illuminated area, it is possible to use, instead of a lens, any other convergent optical and light collecting system and to place detectors in the focal plane of this optical system. It is also possible to increase the number of devices in order to control the evolutions of several differently screened areas for improving the stability of the method. Also, it is possible to polarize the light source and to analyze the light under crossed polarization conditions to increase sensitivity.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

I claim:

1. A method for controlling a water-ink equilibrium in an offset machine including an offset plate fixed on a rotatable cylinder, comprising the steps of:
   illuminating under normal incidence, with a coherent light source, a predetermined area of said offset plate in motion, a density of which is known;
   collecting in a focal plane of a convergent optical system a portion of light reemitted around an axis perpendicular to the said illuminated area; and
   measuring an intensity of the reemitted light at at least one location in the focal plane.

2. A method according to claim 1, wherein:
   the light intensity is measured at said axis.

3. A method according to claim 2, wherein:
   said light intensity is additionally measured at at least one location in the focal plane at a predetermined distance from the axis.

4. A method according to claim 1, wherein:
   said predetermined area is in a screened area.

5. A method according to claim 1, wherein:
   said predetermined area is illuminated in synchronism with a motion of the offset plate.

6. A device for regulating a water-ink equilibrium in an offset machine comprising a movable offset plate fixed on a cylinder, comprising:
   a coherent light source illuminating under a normal incidence a predetermined area of said offset plate in motion;
   light-intensity measuring means, comprising a sensor placed at an axis of and in a focal plane of a convergent optical system, for collecting and measuring the intensity of a fraction of the light reemitted by said area and for generating a corresponding signal; and
   a servo-control system disposed to receive and respond to said signal provided by said sensor for adjusting wetting and/or inking of said offset plate.

7. A device according to claim 6, comprising:
   at least a second sensor placed at a predetermined distance from the axis in the focal plane of said convergent optical system, and
   means cooperating with the servo-control system for determining a wetting condition of said offset plate from a signal provided by said second sensor.

* * * * *